(12) United States Patent
Slesinski et al.

(10) Patent No.: US 10,011,174 B2
(45) Date of Patent: Jul. 3, 2018

(54) TANDEM AXLE GEARING ARRANGEMENT

(71) Applicant: Dana Heavy Vehicle Systems Group, LLC, Maumee, OH (US)

(72) Inventors: Steven G. Slesinski, Ann Arbor, MI (US); Harry W. Trost, Royal Oak, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 15/343,266

(22) Filed: Nov. 4, 2016

(65) Prior Publication Data

US 2018/0126847 A1 May 10, 2018

(51) Int. Cl.
| | |
|---|---|
| *B60K 17/36* | (2006.01) |
| *F16H 48/05* | (2012.01) |
| *F16H 48/08* | (2006.01) |
| *F16H 37/02* | (2006.01) |
| *F16H 37/08* | (2006.01) |
| *B60K 17/08* | (2006.01) |
| *B60K 17/16* | (2006.01) |

(52) U.S. Cl.
CPC .............. *B60K 17/36* (2013.01); *B60K 17/08* (2013.01); *B60K 17/16* (2013.01); *F16H 37/022* (2013.01); *F16H 37/0813* (2013.01); *F16H 48/05* (2013.01); *F16H 48/08* (2013.01); *F16H 2048/087* (2013.01)

(58) Field of Classification Search
None
See application file for complete search history.

(56) References Cited

U.S. PATENT DOCUMENTS

| | | | | |
|---|---|---|---|---|
| 4,194,586 A | * | 3/1980 | Hicks | B60K 17/346 180/24.09 |
| 4,754,847 A | * | 7/1988 | Glaze | B60K 17/16 184/6.12 |
| 6,648,788 B1 | | 11/2003 | Sullivan | |
| 6,766,708 B2 | | 7/2004 | Brooks | |
| 6,991,571 B2 | | 1/2006 | Gady et al. | |

(Continued)

FOREIGN PATENT DOCUMENTS

EP      3045339 A1      7/2016

*Primary Examiner* — Dirk Wright
(74) *Attorney, Agent, or Firm* — Marshall & Melhorn, LLC

(57) ABSTRACT

A drive axle system including a first axle assembly having an input shaft in driving engagement with an under-drive arrangement, an inter-axle differential in driving engagement with the under-drive arrangement, a through drive shaft in driving engagement with the inter-axle differential, a first axle drive pinion in driving engagement with the inter-axle differential, and a first axle differential arrangement including a first axle ring gear in driving engagement with the inter-axle differential through the first axle drive pinion. The drive axle system further includes the second axle assembly in driving engagement with the through drive shaft. The second axle assembly includes a second axle drive pinion drivingly engaged with the through drive shaft and meshingly engaged with a second axle ring gear of a second axle differential arrangement. The under-drive arrangement is configured to reduce a drive ratio of the first axle assembly and the second axle assembly.

11 Claims, 3 Drawing Sheets

(56) References Cited

U.S. PATENT DOCUMENTS

| | | | |
|---|---|---|---|
| 7,140,995 B2 * | 11/2006 | Mierisch | F16H 57/0427 475/221 |
| 9,022,893 B2 | 5/2015 | Hirao et al. | |
| 9,157,508 B2 | 10/2015 | Allgaier et al. | |
| 9,194,472 B2 | 11/2015 | Versteyhe et al. | |
| 2005/0101430 A1 | 5/2005 | Ziech | |
| 2010/0216586 A1 | 8/2010 | Gleasman | |

* cited by examiner

TANDEM AXLE GEARING ARRANGEMENT

FIELD

The present disclosure relates to a gearing arrangement for a tandem axle assembly for a vehicle.

BACKGROUND

Conventional tandem axle assemblies can include forward and rear axle assemblies and a drive shaft assembly connecting the two axle assemblies. The forward and rear axle assemblies each include a pair of axle half shafts extending therefrom on which one or more wheels of a vehicle are mounted. The forward and rear axle assemblies further include a differential gear set that allows the vehicle wheels on each axle assembly to rotate at different speeds. The differential gear set includes a pinion gear in mesh with a ring gear that drives a plurality of bevel gears to cause rotation of the axle half shafts. The pinion gears of the forward and rear axle assemblies are driven by an inter-axle differential housed within the forward axle assembly. The rear axle assembly is driven by the inter-axle differential through the drive shaft.

Vehicles with tandem axles are offered in multiple gear ratios depending on the requirements of the vehicle. To facilitate different gear ratios, the tooth combinations of the ring and pinon gears, amongst other gears, in both the forward and rear axle assemblies must be changed. The slower the desired axle ratio (i.e. the higher numerically), the faster the pinion gear must rotate for a given speed. Power consumption is a multiplication of torque and rotational speed, the power consumption increases as the desired axle ratio increases.

By adjusting the rotational speed of the pinion gears, the rotational speeds of other components, including bearings supporting the gears, must be adjusted. The bearings that support the pinion gears create an inordinate amount of drag as they rotate through lubricant. The parasitic power losses of the bearings is a function of speed due to the amount of parasitic fluid drag resulting from rotating through the lubricant. Power consumption is a function of the multiplication of torque and rotational speed. Thus, the pinion bearings consume more power the slower the axle gear ratio because the bearings rotate at a faster speed.

Therefore, it would be advantageous to develop a tandem drive axle system for a vehicle that reduces the power consumption of the axles including the bearings to improve the overall efficiency of the system and allows for adjusting the desired axle ratio by changing one set of gears.

SUMMARY

A drive axle system including a first axle assembly having an input shaft in driving engagement with a source of rotational energy, an under-drive arrangement in driving engagement with the input shaft, an inter-axle differential in driving engagement with the under-drive arrangement, a through drive shaft in driving engagement with a first portion of the inter-axle differential, a first axle drive pinion in driving engagement with a second portion of the inter-axle differential, and a first axle differential arrangement including a first axle ring gear in driving engagement with a second portion of the inter-axle differential through the first axle drive pinion. The drive axle system further includes the second axle assembly in driving engagement with the through drive shaft. The second axle assembly includes a second axle drive pinion drivingly engaged with the through drive shaft and meshingly engaged with a second axle ring gear of a second axle differential arrangement.

The under-drive arrangement is configured to reduce a drive ratio of the first axle assembly and the second axle assembly between the input shaft and the inter-axle differential. The first axle drive pinion and a first axle ring gear have a fixed gear ratio and the second axle drive pinion and the second axle ring gear have a fixed gear ratio.

In one embodiment, the under-drive arrangement is a set of under-driven helical gears. In another embodiment, the under-drive arrangement is a set of under-driven spur gears. In another embodiment, the under-drive arrangement is a torque vectoring device.

BRIEF DESCRIPTION OF THE DRAWINGS

The above, as well as other advantages of the present embodiments will become readily apparent to those skilled in the art from the following detailed description when considered in the light of the accompanying drawings in which.

DETAILED DESCRIPTION OF THE PREFERRED EMBODIMENTS

It is to be understood that the embodiments may assume various alternative orientations and step sequences, except where expressly specified to the contrary. It is also to be understood that the specific devices and processes illustrated in the attached drawings, and described in the following specification are simply exemplary embodiments of the inventive concepts of the present disclosure. Hence, specific dimensions, directions, orientations or other physical characteristics relating to the embodiments disclosed are not to be considered as limiting, unless expressly stated otherwise.

Figure 1:
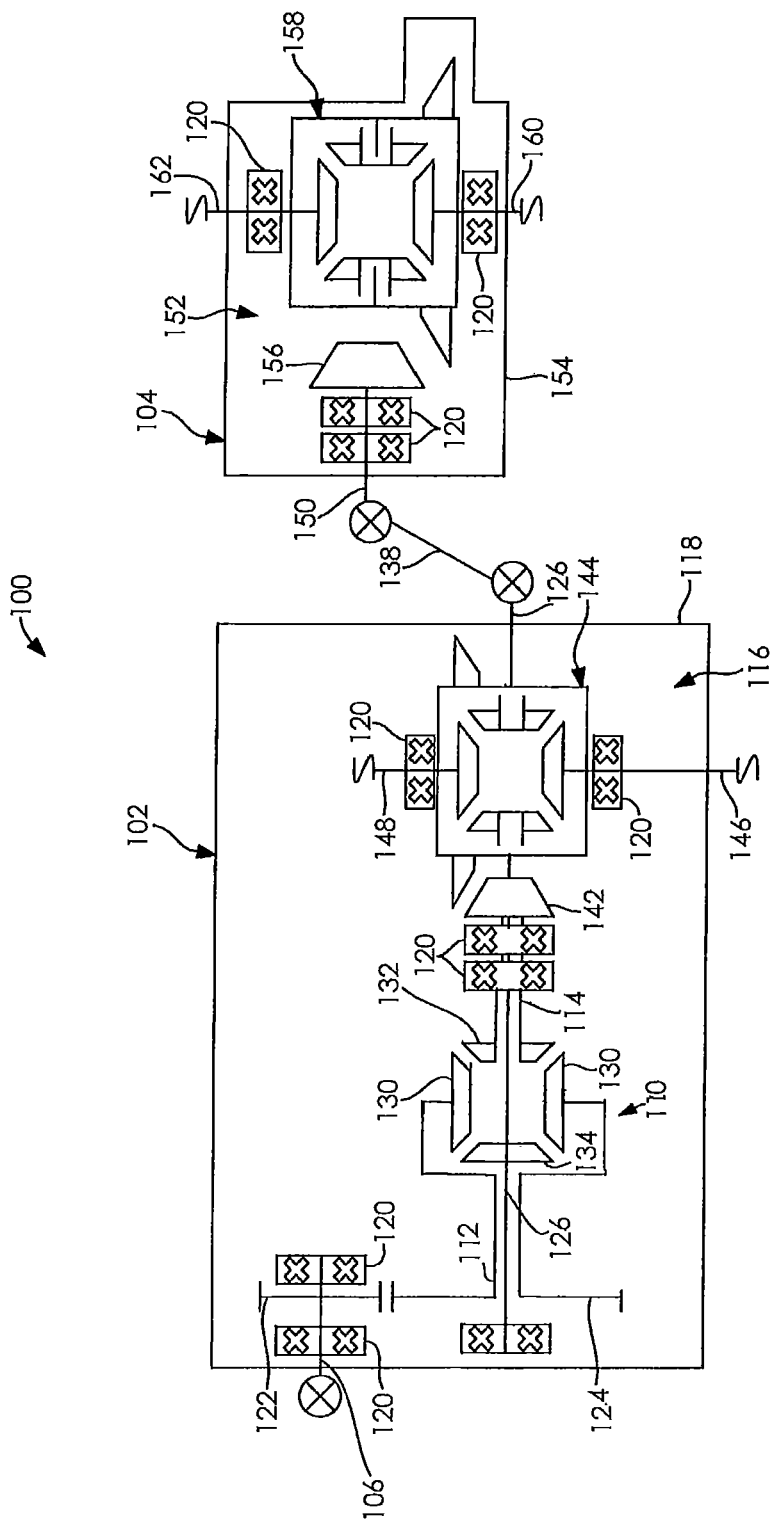
FIG. 1 is a schematic view of a drive axle system including an axle assembly according to a preferred embodiment.

FIG. 1 illustrates a drive axle system 100 according to a preferred embodiment. The drive axle system 100 includes a first axle assembly 102 and a second axle assembly 104. The first axle assembly 102 is in driving engagement with a vehicle transmission (not shown) and the second axle assembly 104.

The first axle assembly 102 includes an input shaft 106, an under-drive arrangement 108, an inter-axle differential 110, an intermediate shaft 112, a first axle drive pinion 114, and a first axle differential arrangement 116. The under-drive arrangement 108, the inter-axle differential 110, the intermediate shaft 112, and the first axle drive pinion 114 are disposed in a housing 118. As shown in FIG. 1, the first axle assembly 102 divides power applied to the input shaft 106 and the under-drive arrangement 108 using the inter-axle differential 110. The inter-axle differential 110 is in driving engagement with the first axle differential arrangement 116 and the second axle assembly 104. It is understood that the drive axle system 100 shown in FIG. 1 may be modified through the addition of features such as an axle disconnect, an inter-axle differential lock, a clutching system that facilitates disconnection of a portion of the drive axle system 100, or a clutching system that facilitates variable engagement of a portion of the drive axle system 100 to facilitate re-engagement of the disconnected portion.

The input shaft 106 is disposed through the housing 118. The input shaft 106 is in driving engagement with a source of rotational energy, which causes the input shaft 106 to rotate within the housing 118. As a non-limiting example, the input shaft 106 may be configured to be in driving engagement with the vehicle transmission (not shown) through a Cardan shaft (not shown). At least one bearing 120, which may be a thrust roller bearing, is in contact with the input shaft 106 to enable it to rotate within the housing 118. A portion of the input shaft 106 is splined to facilitate driving engagement with a first under-drive gear 122 of the under-drive arrangement 108.

The under-drive arrangement 108 includes at least two under-drive gears 122, 124. The under-drive gears 122, 124 are drivingly engaged with one another to reduce a drive ratio between the input shaft 106 and the inter-axle differential 110. In one embodiment the under-drive gears 122, 124 are spur gears.

In another embodiment, the under-drive gears 122, 124 are helical gears. As shown in FIG. 1, a diameter of the first under-drive gear 122 is smaller than a diameter of the second under-drive gear 124. As a non-limiting example, a drive ratio between the first under-drive gear 122 and the second under-drive gear 124 may be about 3:1; however, it is understood that under-drive ratios in the range of about 1.8 to about 4.0 may also be used. However, drive ratios from 1:1 to 23:1 can be achieved. As mentioned hereinabove, the first under-drive gear 122 is mounted for rotation on the input shaft 106. The second under-drive gear 124 is mounted for rotation on the intermediate shaft 112. It is understood that the under-drive arrangement 108 may be the exclusive drive ratio adjusting component of the first axle assembly 102 and the drive axle system 100.

The intermediate shaft 112 is rotatably mounted within the housing 118. The intermediate shaft 112 is in driving engagement with the second under-drive gear 124 and the inter-axle differential 110. At least one bearing 120, which may be a thrust roller bearing, is in contact with the intermediate shaft 112 to enable it to rotate within the housing 118. A first end of the intermediate shaft 112 is splined to facilitate driving engagement with the second under-drive gear 124 of the under-drive arrangement 108; however, it is understood that the intermediate shaft 112 may be configured in another manner that facilitates driving engagement with the second under-drive gear 124. A second end of intermediate shaft 112 is in driving engagement with the inter-axle differential 110, more specifically in driving engagement with a plurality of pinion gears 130 of the inter-axle differential 110. As shown in FIG. 1, the second end of the intermediate shaft 112 may be journaled to a portion of the inter-axle differential 110. In response to rotation of the intermediate shaft 112, the pinion gear 130 drives the inter-axle differential 110. Each of the pinion gears 130 may be a bevel type pinion gear.

The inter-axle differential 110 is a differential device rotatably disposed in the housing 118 and is in driving engagement with a through shaft 126 and the first axle drive pinion 114. As shown in FIG. 1, the inter-axle differential 110 is a bevel gear style differential. The inter-axle differential 110 includes the pinion gears 130, a first side gear 132 and a second side gear 134. The components of the inter-axle differential 110 may be disposed within a case (not shown).

The first side gear 132 is a bevel gear in driving engagement with the pinion gears 130 and the drive pinion 114. A first end of the first side gear 132 is preferably splined to the first axle drive pinion 114, but it is understood that the first side gear 132 may be engaged with the drive pinion 114 in another manner. As mentioned hereinabove, the second end of the through shaft 126 may be journaled to a portion of the inter-axle differential 110, which may be the first side gear 132, as shown in FIG. 1.

The second side gear 134 is a bevel gear in driving engagement with the pinion gears 130. As shown in FIG. 1, the second side gear 134 is disposed about the through shaft 126; it is understood that at least one bearing may be disposed therebetween for rotatably supporting the second side gear 134 and the through shaft 126.

A second end of the first axle drive pinion 114 is fitted with a first gear 142 for rotation with the first axle drive pinion 114. The first gear 142 can be a hypoid or amboid gear to avoid interference with the through shaft 126.

The first axle differential arrangement 116 is partially disposed within the housing 118. The first axle differential arrangement 116 is in driving engagement with the first axle drive pinion 114 and a pair of wheel assemblies (not shown). At least one bearing 120, which may be a thrust roller bearing, is in contact with a portion of the first axle differential arrangement 116 to enable it to rotate within the housing 118.

The first axle differential arrangement 116 includes a differential assembly 144, a first axle half shaft 146, and a second axle half shaft 148. The differential assembly 144 is a conventional differential assembly including a ring gear, differential housing, drive pinions, and side gears as known in the art. The side gears of the differential assembly 144 are drivingly engaged with the first axle half shaft 146 and the second axle half shaft 148, respectively. The ring gear of the differential assembly 144 is drivingly engaged with the first gear 142 to facilitate driving engagement between the first axle drive pinion 114 and the differential assembly 144. The first gear 142 of the first axle drive pinion 114 is drivingly engaged with the ring gear of the differential assembly 144 in a 1:1 drive ratio; however, it is understood that other similar drive ratios may be used.

The through shaft 126 extends concentrically through the drive pinion 114 and the first gear 142 rotates independently thereof. The through shaft 126 is disposed through the housing 118. Preferably, the first axle differential 116 has an offset so as not to interfere with the through shaft 126.

The through shaft 126 is in driving engagement with the second axle assembly 104. At least one bearing 120, which may be a thrust roller bearing, is in contact with the through shaft 126 to enable it to rotate within the housing 118.

The second axle assembly 104 includes a second axle drive pinion 150 and a second axle differential arrangement 152. The second axle drive pinion 150 and the second axle differential arrangement 152 are disposed in a housing 154. As shown in FIG. 1, the first axle assembly 102 divides power applied to the input shaft 106 and the under-drive arrangement 108 using the inter-axle differential 110. The inter-axle differential 110 is in driving engagement with the second axle assembly 104 through the through shaft 126 and the Cardan shaft 138.

The second axle drive pinion 150 is rotatably disposed through the housing 154. The second axle drive pinion 150 is in driving engagement with the Cardan shaft 138 and the second axle differential arrangement 152. At least one bearing 120, which may be a thrust roller bearing, is in contact with the second axle drive pinion 150 to enable it to rotate within the housing 154. A first end of the second axle drive pinion 150 is splined to facilitate driving engagement with a yoke (not shown) farming a portion of the Cardan shaft 138; however, it is understood that the second axle drive pinion 150 may be configured in another manner that facilitates driving engagement with the Cardan shaft 138. A second end of the second axle drive pinion 150 is fitted with a spiral bevel gear 156 for rotation with the second axle drive pinion 150; however, it is understood that the second axle drive pinion 150 may be configured in another manner for engaging the second axle differential arrangement 152.

The second axle differential arrangement 152 is partially disposed within the housing 154. The second axle differential arrangement 152 is in driving engagement with the second axle drive pinion 150 and a pair of wheel assemblies (not shown). At least one bearing 120, which may be a thrust roller bearing, is in contact with a portion of the second axle differential arrangement 152 to enable it to rotate within the housing 154. The second axle differential arrangement 152 includes a differential assembly 158, a first axle half shaft 160, and a second axle half shaft 162. The differential assembly 158 is a conventional differential assembly including a ring gear, differential housing, drive pinions, and side gears as known in the art. The side gears of the differential assembly 158 are respectively drivingly engaged with the first axle half shaft 160 and the second axle half shaft 162. The ring gear of the differential assembly 158 is drivingly engaged with the spiral bevel gear 156 to facilitate driving engagement between the second axle drive pinion 150 and the differential assembly 158.

Figure 2:
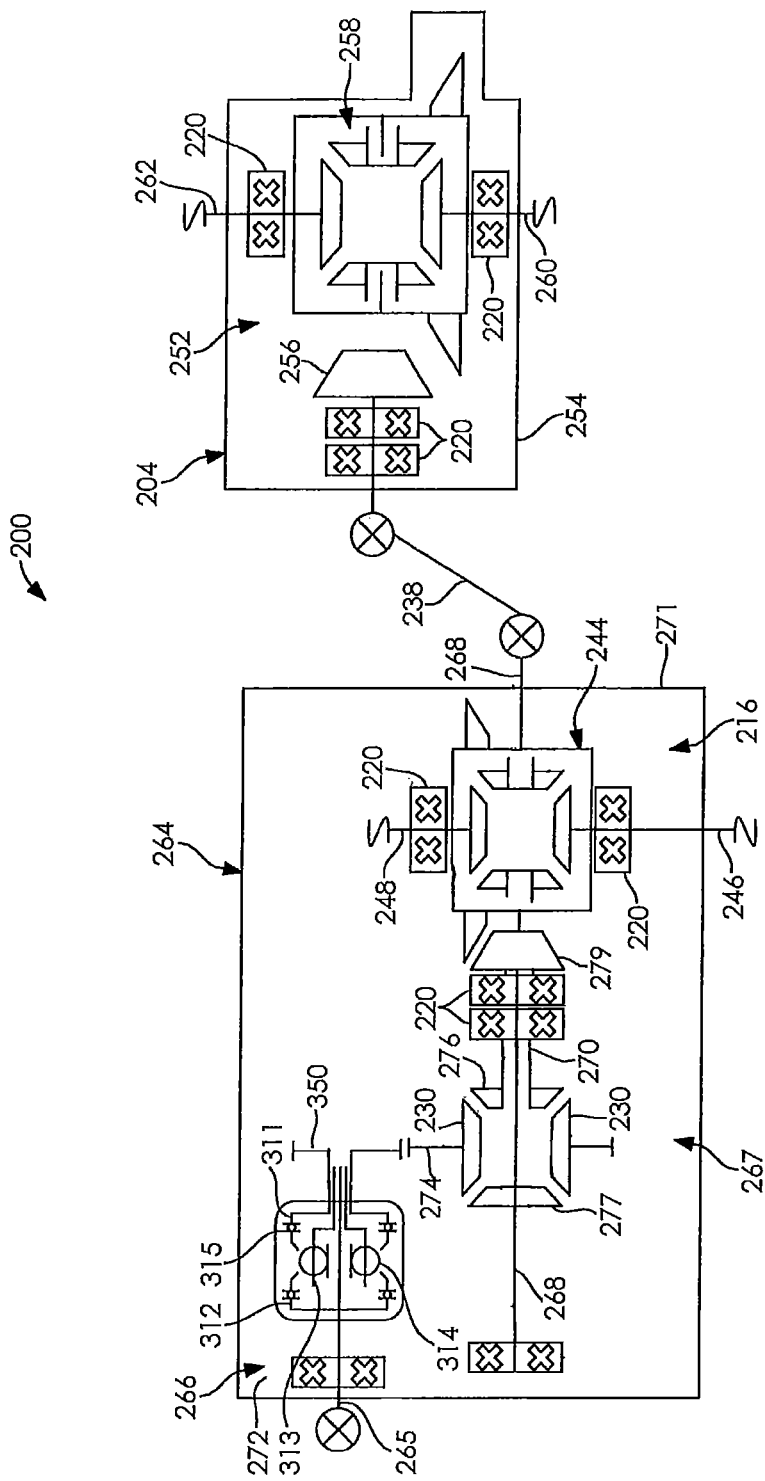
FIG. 2 is a schematic view of a drive axle system including an axle assembly according to another preferred embodiment.

FIG. 2 illustrates a drive axle system 200 according to another preferred embodiment. The embodiment shown in FIG. 2 includes similar components to the drive axle system 100 illustrated in FIG. 1. Similar features of the embodiment shown in FIG. 2 are numbered similarly in series, with the exception of the features described below.

The drive axle system 200 includes a first axle assembly 264 and a second axle assembly 204. The first axle assembly 264 is in driving engagement with a vehicle transmission (not shown) and the second axle assembly 204.

The first axle assembly 264 includes an input shaft 265, an under-drive arrangement 266, an inter-axle differential 267, a through shaft 268, a first axle drive pinion 270, and a first axle differential arrangement 216. The under-drive arrangement 266, the inter-axle differential 267, the through shaft 268, and the first axle drive pinion 270 are disposed in a housing 271. As shown in FIG. 2, the first axle assembly 264 divides power applied to the input shaft 265 and the under-drive arrangement 266 using the inter-axle differential 267. The inter-axle differential 267 is in driving engagement with both the first axle differential arrangement 216 and the second axle assembly 204. It is understood that the drive axle system 200 shown in FIG. 2 may be modified through the addition of features such as an axle disconnect, an inter-axle differential lock, a clutching system that facilitates disconnection of a portion of the drive axle system 200, or a clutching system that facilitates variable engagement of a portion of the drive axle system 200 to facilitate re-engagement of the disconnected portion.

The input shaft 265 is disposed through the housing 271. The input shaft 265 is in driving engagement with a source of rotational energy, which causes the input shaft 265 to rotate within the housing 271. As a non-limiting example, the input shaft 265 may be configured to be in driving engagement with the vehicle transmission (not shown) through a Cardan shaft (not shown). At least one bearing 220, which may be a thrust roller bearing, is in contact with the input shaft 265 to enable it to rotate within the housing 271. A portion of the input shaft 265 is splined to facilitate driving engagement with the under-drive arrangement 266; however, it is understood that the input shaft 265 may be configured in another manner that facilitates driving engagement with the under-drive arrangement 266.

In one embodiment, as shown in FIG. 2, the under-drive arrangement 266 is torque-vectoring device, more specifically, a variator. The variator 266 as shown in FIG. 2 is a ball type continuously variable variator; however, other continuously variable variators can be used. The variator 266 includes a variator carrier assembly 313, a set of tilting balls 314, a first ring assembly 312, and a second ring assembly 311. The variator carrier assembly 313 is mechanically coupled to the inter-axle differential 267.

The first ring assembly 312 is rotatably disposed in a housing 317. The first ring assembly 312 includes a first variation ball engagement surface that is in engagement with a plurality of variator balls 314 of the variator carrier assembly 313. The first ring assembly 312 is drivingly engaged by the input shaft 265.

The second ring assembly 311 is rotatably disposed in the housing 317. The second ring assembly 311 includes a second variator ball engagement surface that is in driving engagement with variator balls 314 of the carrier assembly 313. The second ring assembly 311 of the variator 266 is drivingly engaged to the first axle differential arrangement 216 of the vehicle through an output gear 350. This may be achieved using a series of gears as shown or in another manner The variator 266 itself works with a traction fluid. The lubricant between the ball 314 and the conical rings acts as a solid at high pressure, transferring the power from the first ring assembly 312, through the variator balls 314, to the second ring assembly 311. At a low pressure, the variator 266 functions as a torque converter. The variator 266 as shown in FIG. 2 includes two of the variator balls 314; however, it is understood that the variator 266 may include more or less variator balls 314.

An actuator assembly 315 is positioned on each side of the variator 266 to provide the clamping force necessary to transfer the torque. As shown in FIG. 2, the actuator assemblies 315 are ball ramp actuators; however, it is understood that the actuator assemblies 315 may be hydraulically, electrically, or pneumatically actuators. The actuator assemblies 315 are typically controlled automatically by a controller (not shown) based on an input from a plurality of sensors (not shown). However, it is understood that the actuator assemblies 315 may be controlled manually by an operator of the vehicle the variator 266 is incorporated in.

The ball ramp actuators 315 include a first thrust ring on the first ring assembly 312 and a second thrust ring on the second ring assembly 311 generate an amount of axial force necessary for proper transfer of torque; however, it is understood that the amount of axial force necessary for proper operation may be generated by a clamping mechanism (not shown).

By tilting the variator balls' 314 axles, the ratio can be changed between input shaft 265 and the output 350 which is connected to the second ring assembly 311. When the axis of each of the variator balls 314 is horizontal the ratio is one, when the axis is tilted the distance between the axis and the contact point change, modifying the overall ratio.

It is understood that the variator 266 may be the exclusive drive ratio adjusting component of the first axle assembly 264 and the drive axle system 200.

The intermediate shaft 274 is rotatably mounted within the housing 271. The intermediate shaft 274 is in driving engagement with the second ring assembly 311 and the inter-axle differential 267. At least one bearing 220, which may be a thrust roller bearing, is in contact with the intermediate shaft 274 to enable it to rotate within the housing 271. A first end of the intermediate shaft 274 is splined to facilitate driving engagement with the second ring assembly 311 of the under-drive arrangement 266 through output gear 350; however, it is understood that the intermediate shaft 274 may be configured in another manner that facilitates driving engagement with the second ring assembly 311.

A second end of the intermediate shaft 274 may be journaled to a portion of the inter-axle differential 267. More particularly, the intermediate shaft 274 is drivingly engaged with a pinion gear 230 of the inter-axle differential 267. The pinion gear 230 is part of the inter-axle differential 267 which also includes a plurality of pinion gears 230. Each of the pinion gears 230 may be a bevel type pinion gear.

The inter-axle differential 267 is a differential device rotatably disposed in the housing 271 and is in driving engagement with the intermediate shaft 274, first axle drive pinion 270, and the variator 266. As shown in FIG. 2, the inter-axle differential 267 is a bevel gear style differential; however, it is understood that other differential types may be used. The inter-axle differential 267 includes the pinion gears 230, a first side gear 276, and a second side gear 277. The components of the inter-axle differential 267 may be disposed within a housing (not shown).

The first side gear 276 is a bevel gear in driving engagement with the pinion gears 230 and the first axle drive pinion 270. The first side gear 276 is preferably splined to the first axle drive pinion 270, but it is understood that the first side gear 276 may be engaged with the first axle drive pinion 270 in another manner.

The first axle drive pinion 270 is rotatably disposed within the housing 271. The first axle drive pinion 270 is in driving engagement with the first side gear 276 of the inter-axle differential 267. At least one bearing 220, which may be a thrust roller bearing, is in contact with the first axle drive pinion 270 to enable it to rotate within the housing 271. A second end of the first axle drive pinion 270 is fitted with a first gear 279 for rotation with the first axle drive pinion 270; however, it is understood that the first axle drive pinion 270 may be configured in another manner for engaging the first axle differential arrangement 216.

The first axle differential arrangement 216 is partially disposed within the housing 271. The first axle differential arrangement 216 is in driving engagement with the first axle drive pinion 270 and a pair of wheel assemblies (not shown). At least one bearing 220, which may be a thrust roller bearing, is in contact with a portion of the first axle differential arrangement 216 to enable it to rotate within the housing 271. The first axle differential arrangement 216 includes a differential assembly 244, a first axle half shaft 246, and a second axle half shaft 248. The differential assembly 244 is a conventional differential assembly including a ring gear, differential housing, drive pinions, and side gears as known in the art. The side gears of the differential assembly 244 are respectively drivingly engaged with the first axle half shaft 246 and the second axle half shaft 248. The ring gear of the differential assembly 244 is drivingly engaged with the first gear 242 to facilitate driving engagement between the first axle drive pinion 270 and the differential assembly 244. The first gear 279 of the first axle drive pinion 270 is drivingly engaged with the ring gear of the differential assembly 244 in a 1:1 drive ratio; however, it is understood that other similar drive ratios may be used.

The through shaft 268 is disposed through the housing 271. The through shaft 268 is in driving engagement with the second side gear 277 of the inter-axle differential 267 and the second axle assembly 204 such as through a Cardan shaft 238, for example. At least one bearing 220, which may be a thrust roller bearing, is in contact with the through shaft 268 to enable it to rotate within the housing 271. The through shaft 268 extends concentrically through the drive pinion 270 and the first gear 279 rotates independently thereof. The through shaft 268 is disposed through the housing 271. Preferably, the first axle differential arrangement 216 has an offset so as not to interfere with the through shaft 268.

The second axle assembly 204 includes a second axle drive pinion 250 and a second axle differential arrangement 252. The second axle drive pinion 250 and the second axle differential arrangement 252 are disposed in a housing 254. As shown in FIG. 2, the first axle assembly 264 divides power applied to the input shaft 265 and the under-drive arrangement 266 using the inter-axle differential 267. The inter-axle differential 267 is in driving engagement with the second axle assembly 204 through the through shaft 268 and the Cardan shaft 238.

The second axle drive pinion 250 is rotatably disposed through the housing 254. The second axle drive pinion 250 is in driving engagement with the Cardan shaft 238 and the second axle differential arrangement 252. At least one bearing 220, which may be a thrust roller bearing, is in contact with the second axle drive pinion 250 to enable it to rotate within the housing 254. A first end of the second axle drive pinion 250 is splined to facilitate driving engagement with a yoke (not shown) forming a portion of the Cardan shaft 238; however, it is understood that the second axle drive pinion 250 may be configured in another manner that facilitates driving engagement with the Cardan shaft 238. A second end of the second axle drive pinion 250 is fitted with a spiral bevel gear 256 for rotation with the second axle drive pinion 250; however, it is understood that the second axle drive pinion 250 may be configured in another manner for engaging the second axle differential arrangement 252.

The second axle differential arrangement 252 is partially disposed within the housing 254. The second axle differential arrangement 252 is in driving engagement with the second axle drive pinion 250 and a pair of wheel assemblies (not shown). At least one bearing 220, which may be a thrust roller bearing, is in contact with a portion of the second axle differential arrangement 252 to enable it to rotate within the housing 254. The second axle differential arrangement 252 includes a differential assembly 258, a first axle half shaft 260, and a second axle half shaft 262. The differential assembly 258 is a conventional differential assembly including a ring gear, differential housing, drive pinions, and side gears as known in the art. The side gears of the differential assembly 258 are respectively drivingly engaged with the first axle half shaft 260 and the second axle half shaft 262. The ring gear of the differential assembly 258 is drivingly engaged with the spiral bevel gear 256 to facilitate driving engagement between the second axle drive pinion 250 and the differential assembly 258.

In view of the embodiments of the drive axle systems 100, 200 described hereinabove, the present disclosure is also directed to a method of selecting a drive arrangement for the drive axle system 100, 200. The method includes several steps that result in the selection of components that minimize a power consumption of the drive axle system 100, 200. First, an overall drive ratio for the drive axle system 100, 200 is selected, wherein the drive axle system 100, 200 includes the first axle differential arrangement 116, 216, the second axle differential arrangement 152, 252, an inter-axle differential 110, 267, and an under-drive arrangement 108, 266. Then a drive ratio for the first axle drive pinion 114, 270 is selected for the first axle differential arrangement 116, 216 that minimizes a power consumption of the drive axle system 100, 200. Then a drive ratio for the second axle drive pinion 150, 250 is selected for the second axle differential arrangement 152, 252 that minimizes a power consumption of the drive axle system 100, 200. Lastly, a drive ratio for the under-drive arrangement 108, 266 is selected that results in the previously selected overall drive ratio for the drive axle system 100, 200.

Figure 3:
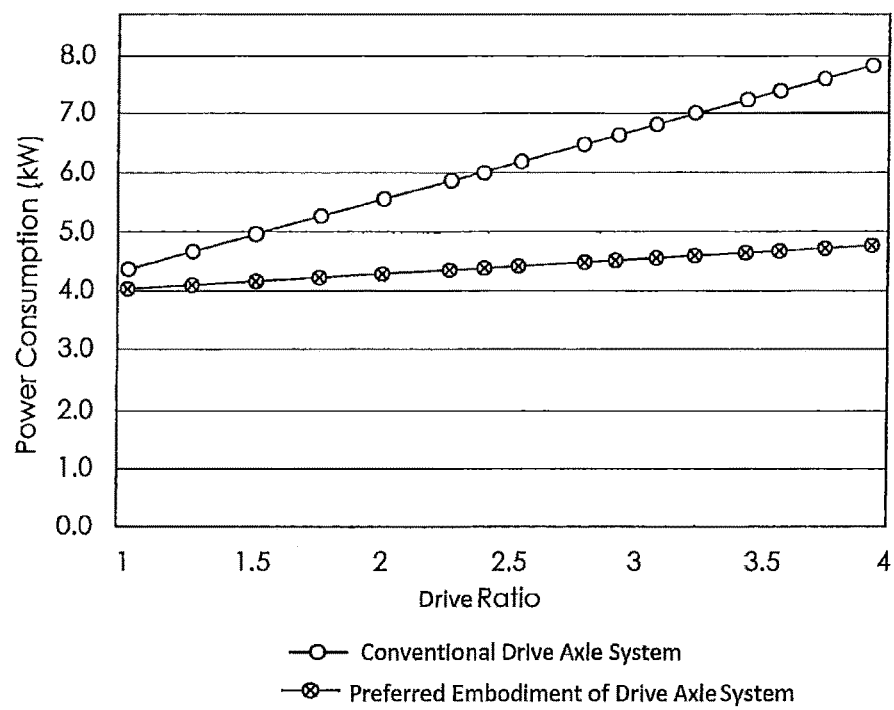
FIG. 3 is a line chart illustrating an amount of power consumption versus a drive ratio of a conventional drive axle system and the preferred drive axle system of FIG. 1.

FIG. 3 is a line chart illustrating an amount of power consumption (in kW) versus a drive ratio of both a conventional drive axle system and the drive axle system 100. A horizontal axis of the line chart indicates a drive ratio with which the conventional drive axle system or the under-drive arrangement 108 may be configured with. A vertical axis of the chart indicates a power consumption (in kW) of the conventional drive axle system or the drive axle systems 100. As shown in FIG. 3, the conventional drive axle system has a variable power consumption based on a drive ratio with which the conventional drive axle system is configured with. As mentioned hereinabove, it is well known in the art that power losses of bearings increase as rotational speed does. The drive axle system 100, 200 of the present disclosure reduce power consumption (which primarily occurs due to losses present in the operation of the bearings 120, 220 at increased speeds) of the drive axle systems 100, 200 by isolating all of the drive ratio adjustment to the under-drive arrangement 108, 266. As shown in FIG. 3, the power consumption (in kW) the drive axle system 100 is reduced from a minimum of about 25% at a drive ratio of 2.26 to a maximum of about 40% at a drive ratio of 3.91 when compared to the power consumption of the conventional drive axle system.

Figure 4:
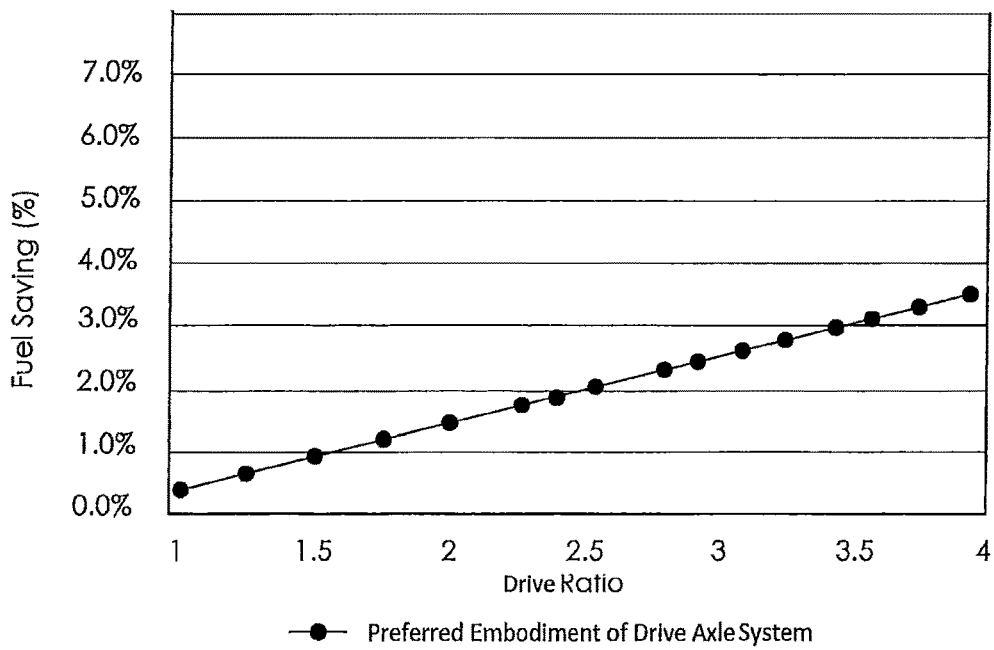
FIG. 4 is a line chart illustrating an amount of fuel savings versus a drive ratio of the preferred drive axle system of FIG. 1.

FIG. 4 is a line chart illustrating an amount of fuel savings (in percentage) versus a drive ratio of the drive axle system 100. A horizontal axis of the line chart indicates a drive ratio with which the under-drive arrangement 108 may be configured with. A vertical axis of the chart indicates the fuel savings (in percentage) of the drive axle system 100. Because the drive axle systems 100, 200 reduce power consumption (which primarily occurs due to losses present in the operation of the bearings 120, 220 at increased speeds) of the drive axle systems 100, 200 by isolating all of the drive ratio adjustment to the under-drive arrangement 108, 266, the drive axle systems 100, 200 decrease fuel consumption of a vehicle the drive axle systems are incorporated in. As shown in FIG. 4, the fuel consumption (in percentage) of the drive axle system 100 is decreased by about 1.5% at a drive ratio of 2.26 to a maximum of about 3.1% at a drive ratio of 3.91 when compared to the fuel consumption of the conventional drive axle system.

In accordance with the provisions of the patent statutes, the present disclosure has been described in what is considered to represent its preferred embodiments, however, it should be noted that the embodiments can be practiced otherwise than as specifically illustrated and described without departing from its scope or spirit.

What is claimed is:

1. A drive axle system, comprising:
a first axle assembly comprising:
an input shaft in driving engagement with a source of rotational energy,
an under-drive arrangement in driving engagement with the input shaft,
an inter-axle differential in driving engagement with the under-drive arrangement,
a through drive shaft in driving engagement with a first portion of the inter-axle differential,
a first axle drive pinion in driving engagement with a second portion of the inter-axle differential,
a first axle differential arrangement including a first axle ring gear in driving engagement with the first axle pinion; and
a second axle assembly in driving engagement with the through drive shaft comprising a second axle drive pinion in driving engagement with a second axle ring gear of a second axle differential arrangement,
wherein the under-drive arrangement includes at least two under-drive gears in driving engagement with each other and configured to reduce a drive ratio of the first axle assembly and the second axle assembly between the input shaft and the inter-axle differential,
wherein the first axle drive pinion and the first axle ring gear have a fixed gear ratio, and
wherein the second axle drive pinion and the second axle ring gear have a fixed gear ratio.

2. The drive axle system according to claim 1, wherein the under-drive arrangement is the exclusive drive ratio adjusting component of the drive axle system.

3. The drive axle system according to claim 1, wherein the first axle drive pinion includes a first gear meshingly engaged with the first axle ring gear.

4. The drive axle system according to claim 1, wherein the under-drive gears are helical gears.

5. The drive axle system according to claim 1, wherein the under-drive gears are spur gears.

6. The drive axle system according to claim 3, wherein the first gear and the first axle ring gear are in a 1:1 drive ratio.

7. The drive axle system according to claim 3, wherein the first gear is a hypoid or an amboid gear.

8. The drive axle system according to claim 1, wherein the second axle assembly further includes a second axle drive pinion in driving engagement with the through drive shaft and the second axle differential arrangement.

9. The drive axle system according to claim 1, wherein the second axle drive pinion includes a spiral bevel gear meshingly engaged with the second axle ring gear.

10. The drive axle system according to claim 9, wherein the spiral bevel gear and the second axle ring gear are in a 1:1 drive ratio.

11. A method of selecting a drive arrangement for a drive axle system, comprising:
selecting an overall drive ratio for the drive axle system, wherein the drive axle system includes a first axle differential arrangement, a second axle differential arrangement, an inter-axle differential, and an under-drive arrangement;
selecting a drive ratio for a first axle drive pinion and the first axle differential arrangement that minimizes a power consumption of the drive axle system;
selecting a drive ratio for a second axle drive pinion and the second axle differential arrangement that minimizes a power consumption of the drive axle system; and selecting a drive ratio for the under-drive arrangement that results in the previously selected overall drive ratio for the drive axle system, wherein the under-drive arrangement is drivingly engaged with an input shaft and the inter-axle differential, a first portion of the inter-axle differential is drivingly engaged the first axle drive pinion and a second portion of the inter-axle differential is drivingly engaged with the second axle drive pinion.

* * * * *